United States Patent [19]

Shimizu et al.

[11] 4,186,993
[45] Feb. 5, 1980

[54] EPIDARK ILLUMINATION SYSTEM

[75] Inventors: Yoshiyuki Shimizu; Takeshi Sudo, both of Kawasaki, Japan

[73] Assignee: Nippon Kogaku K.K., Tokyo, Japan

[21] Appl. No.: 835,786

[22] Filed: Sep. 22, 1977

[30] Foreign Application Priority Data

Sep. 30, 1976 [JP] Japan .................. 51/130525[U]

[51] Int. Cl.$^2$ ............................................. G02B 21/10
[52] U.S. Cl. ................................................... 350/91
[58] Field of Search ................ 350/91, 89, 236, 237, 350/188, 8, 12, 13; 362/355

[56] References Cited

U.S. PATENT DOCUMENTS

| 1,627,892 | 5/1927 | Frederick | 350/188 |
| 2,809,554 | 10/1957 | Bernhardt | 350/89 |

Primary Examiner—Jon W. Henry
Attorney, Agent, or Firm—Fitzpatrick, Cella, Harper & Scinto

[57] ABSTRACT

An epidark illumination system for use with a microscope in which a sample is illuminated from around an objective by a ring-shaped light flux having its center coincident with the optic axis of the objective to enable the sample to be observed in a dark field of view comprises a ring-shaped condenser lens member disposed adjacent to the forward end of the objective with the center of the lens member being coincident with the optic axis of the objective to condense the light flux upon the sample, and a scattering member for scattering the ring-shaped light flux disposed in the light path before the ring-shaped light flux reaches the ring-shaped condenser lens member.

3 Claims, 2 Drawing Figures

EPIDARK ILLUMINATION SYSTEM

BACKGROUND OF THE INVENTION

1. Field of the Invention

This invention relates to improvements in an epidark illumination system for use with a microscope.

2. Description of the Prior Art

A conventional epidark illumination system is shown in FIG. 1 of the accompanying drawing, wherein for enabling observation in a dark field of view within a reflection type microscope, a ring-shaped light flux 3 surrounding an objective 1 and having its center coincident with the optical axis of the objective is supplied from an unshown light source and such light beam is condensed upon a sample 2 by a ring-shaped condenser lens L1 disposed adjacent to the forward end of the objective.

The illumination system for a microscope must usually satisfy these requirements: (1) it must be bright; (2) it must be free of irregularity of illumination. The epidark illumination system for a dark field reflection type microscope must further satisfy the requirement; and (3) it must create no flare, that is, it must illuminate only the minimum necessary portion (real field of view). The conventional epidark illumination system has attempted to satisfy all the above three requirements by using a diffusing surface as at least one surface of the condenser lens L1 shown in FIG. 1. In such a case, the field of view provided may be free of irregularity of illumination to some extent, but the illuminating light is unnecessarily extensive even to a range beyond the observation field of view so that efficiency is low and not only is the illumination dark but also, as indicated by arrows in FIG. 1, the light rays outside the field of view are reflected by the surface of the sample and enter the objective to form a flare which seriously mars the contrast of the formed image. There has also been an arrangement which uses a metal mirror to condense the illuminating light, but this has not been satisfactory in that the reflection factor is low and the loss of light is great. Thus, the illumination systems as referred to above could not fully display their performance however excellent in performance the objectives therein were.

SUMMARY OF THE INVENTION

We have conceived and contribute by the present invention an epidark illumination system by which we are to overcome the above-noted disadvantages and to provide an epidark illumination system which is more efficient and superior in performance than those known to us.

In the usual illumination systems, the more efficiently focused is the image of the light source, the less illuminated is the unnecessary portion, and brighter illumination is possible while, on the other hand, the image of the light source clearly appears on the surface of the sample to create irregularity of illumination. To prevent such irregularity of illumination, the illuminating light must be scattered in some way or other. That is, the illuminating system must have two incompatible functions to satisfy the aforementioned three requirements, namely, the function of enhancing the condensing performance of the condenser lens and the function of scattering the illuminating light. In the conventional epidark illumination systems, however, the scattering action has been provided by using a diffusing surface as the refracting surface of the condenser lens and such a tendency has unavoidably led to the result that efforts to intensify the scattering action result in aggravation of the condensing performance while an effort to improve the condensing performance results in creation of irregularity of the intensity of illumination. Thus, compromise has been sought after between the two functions and it has been found that the illumination system of such construction is unnecessarily limited in performance.

The present invention is based on the concept that prevention of flare or illumination only of the minimum necessary portion (real field of view) is of primary importance to improve the performance of the epidark illumination system and therefore, according to the present invention, the condenser lens is only endowed with its intrinsic condensing function to enhance the performance thereof. It has also been found that the scattering of the illuminating light beam for maintaining the uniformity of illumination should most advantageously occur in the light path before the light flux reaches the condenser lens, because this does not disturb the condensing performance of the condenser lens. By separating the condensing function and the scattering function in this manner, there is realized an epidark illumination system in which these two functions can take place substantially independently of each other and the aforementioned three requirements are fully satisfied.

Where a diffusing surface was used for one surface of the condenser lens as was conventionally practised, the groups of rays which are widely divergent, of the rays scattered in all directions, passed through the condenser lens with a result that the focused condition was seriously disturbed and even the unnecessary area on the surface of the sample was illuminated to create flare. In contrast, according to the present invention, the condenser lens and the scattering member are disposed in a predetermined spaced apart relationship so as to separate the condensing functlion and the scattering function from each other, and only the groups of rays which are nearly parallel to the optic axis of the condenser lens, of the rays scattered in all directions, reach the condenser lens for condensation thereby and thus, the condensed condition can be made approximate to an ideal condition.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention has been chosen for purposes of illustration and description, and are shown in the accompanying drawings, forming a part of the specification wherein.

DESCRIPTION OF THE PREFERRED EMBODIMENTS

Figure 1:
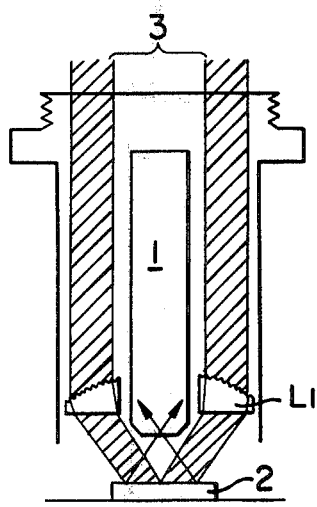
FIG. 1 is a cross-sectional view of an objective on which a conventional epidark illumination system is mounted.
Figure 2:
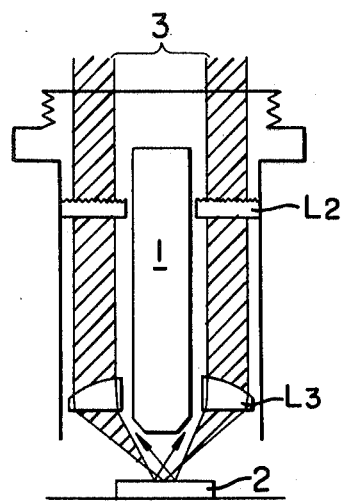
FIG. 2 is a cross-sectional view of a preferred embodiment of the present invention.

Referring to FIG. 2, a cross-sectional view of an embodiment of the present invention is shown wherein a ring-shaped illuminating light flux 3 supplied from an unshown light source is scattered by a ring-shaped transparent scattering member L2 one or both surfaces of which are diffusing surfaces, and the light is condensed only within the observation field of a sample 2 by a ring-shaped condenser lens L3 disposed adjacent to the forward end of an objective 1 and having both of its surfaces polished. Thus, the light rays directly reflected from the sample 2 do not enter the objective, as indicated by arrows, whereby effective illumination is achieved with the illumination maintained uniform.

As the distance between the condenser lens L3 and the scattering member L2 becomes greater, the groups of rays reaching the condenser lens L3 become more approximately parallel to the optic axis of the condenser lens so that a better condensed condition is provided; while there is also a tendency for those of the scattered rays which reach the condenser lens L3 to be decreased with a resultant loss of quantity of light. On the other hand, as regards the illuminated condition on the sample 2, the intensity of illumination depends, of course, on the range illuminated, namely, the extent of the real field of view to be illuminated, and the uniformity of illumination is variable chiefly by the intensity of the scattering function of the scattering member L2 and the condition of the light source; therefore, in accordance with the performance of the objective and the light source used, the scattering member must be determined and the distance between the condenser lens L3 and the scattering member L2 must be selected appropriately. In the present invention, with this taken into consideration, it has been found that the scattering member L2 should be disposed in the light path upstream of the condenser lens L3 with respect to the direction of light beam flow; and it is desirable for the scattering member L2 to be located at a position between the middle of the length of the lens barrel of the objective 1 and the vicinity of the portion thereof attached to the body of the microscope. As a result, a cylinder for epidark illumination may have integrally formed therewith the ring-shaped condenser lens L3 and the ring-shaped scattering member L2, wherefore detachable mounting of the epidark illumination system with respect to the objective may be accomplished by a procedure similar to the conventional one.

In the present embodiment, the transparent scattering member L2 having at least one diffusing surface is employed as the member for scattering the illuminating light beam, whereas such member is not restrictive but use may be made of any member which will effect suitable scattering and the condenser lens L3 may be replaced by a Fresnel lens. Also, if a decreased quantity of light and additional intricacies of the construction of the epidark illumination system are not critical, it will be possible to provide the scattering member near the light source and provide the light source itself with a uniform intensity of illumination.

Thus, by the simple construction as described above, there is provided an illumination system which enables bright and effective illumination free of irregularity and which has proven excellent for observation of a dark field of view.

We believe that the construction and utilization of our novel epidark illumination system for use with a microscope will now be understood, and that the advantages thereof will be fully appreciated by those persons skilled in the art.

We claim:

1. An epidark illumination system for use with a microscope in which a sample is illuminated from around an objective by a ring-shaped light flux having its center coincident with the optical axis of the objective to enable the sample to be observed in a dark field of view, said system comprising;

a ring-shaped condenser lens member disposed adjacent to the forward end of said objective with the center of said lens member being coincident with the optical axis of said objective to condense said light flux upon the sample; and a ring-shaped transparent scattering member for scattering said ring-shaped light flux in the light pass upstream of said ring-shaped condenser lens member and located at a position between the middle of the length of the lens barrel of the objective and the vicinity of the portion thereof attached to the body of the microscope.

2. An epidark illumination system as defined in claim 1, wherein at least one of the transmitting surfaces of said ring-shaped transparent scattering member is a diffusion surface.

3. An epidark illumination system as defined in claim 2, wherein said ring-shaped condenser lens member and said scattering member are formed integrally with each other for detachable mounting with respect to said objective.

* * * * *